(No Model.)

J. P. BARKER.
STOVE PIPE ELBOW.

No. 287,494. Patented Oct. 30, 1883.

Witnesses:

Inventor:
Jared P. Barker
By J. W. Forel Atty

UNITED STATES PATENT OFFICE.

JARED P. BARKER, OF LE ROY, NEW YORK.

STOVE-PIPE ELBOW.

SPECIFICATION forming part of Letters Patent No. 287,494, dated October 30, 1883.

Application filed July 5, 1883. (No model.)

*To all whom it may concern:*

Be it known that I, JARED P. BARKER, a citizen of the United States, residing at Le Roy, in the county of Genesee and State of New York, have invented a new and useful Pipe-Elbow, of which the following is a specification.

My invention relates to improvements in pipe-elbows made from sheet metal in which a right angle is formed by the use of three squares of an octagon; and the objects are, first, to change the course of the matter passing through the pipe with but a slight resistance; second, to afford facilities for running a pipe upon an obtuse angle by the use of one-half of the elbow, which may have a detachable joint in the center square; also, to enable an offset to be made in the pipe upon an angle most conducive to the passage of the inclosed matter. I attain these objects by the mechanism illustrated in the accompanying drawings, in which—

Figure 1:
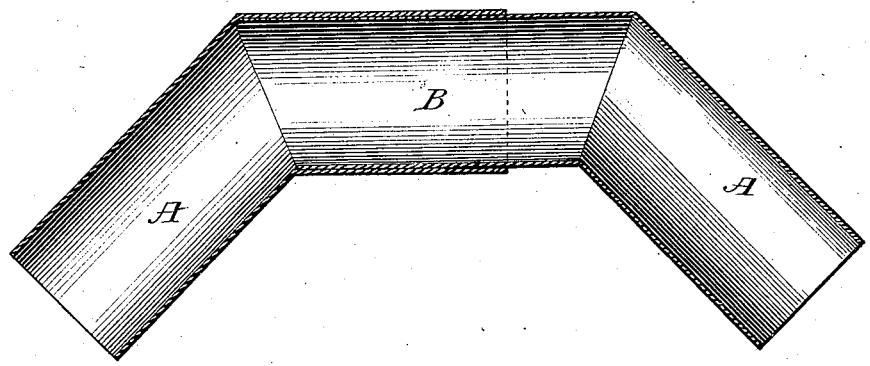
Figure 2:
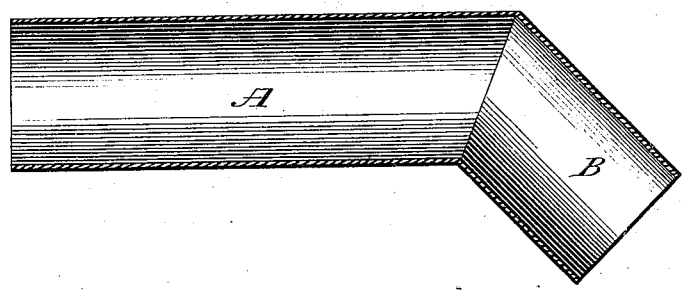
Figure 3:
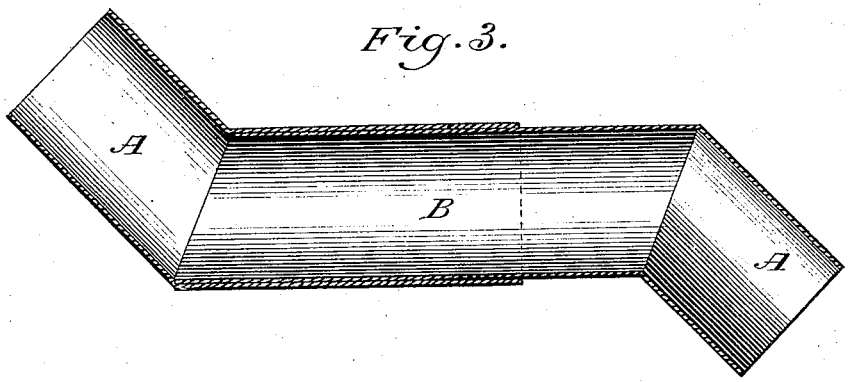

Figure 1 is a view of the elbow in position for turning the pipe at a right angle. Fig. 2 is a view of one-half of the right-angled elbow disconnected by the joint in the center for the purpose of turning the pipe upon an obtuse angle; and Fig. 3 is a view of the elbow with one section turned one-half around, so as to form an offset in the pipe at an angle of forty-five degrees.

Similar letters refer to similar parts throughout the several views.

In the use of the ordinary right-angled stove-pipe elbow an obstruction to the draft is caused by turning the course of the smoke in an abrupt manner, as well as causing a lodgment of ashes, soot, &c., at the turning-point. Quadrantal elbows made from sheet metal require a superior quality of material, and often require complicated machinery to manufacture, and therefore are objectionable. When it is desirous to make an offset in a pipe by the use of any of the well-known elbows, only a right-angle turn can be made, thus materially checking the flow of the matter in the pipe. To obviate these difficulties, and to be able to run the pipe at a right angle as well as diagonally, also to make an offset upon a gradual incline by the use of only one style of elbow, and without necessitating special devices, this invention has been made. The two sections A A stand at right angles each with the other and are connected by the part B, whose angle runs obtusely with the parts A, and when in position the angles conform to three sides of an octagon. By this arrangement a right angle is formed by a deflection that is presented by an obtuse angle and offers but a slight resistance to the moving matter within the pipe. The incline B is jointed and the elbow made in two parts, (see Fig. 2,) and by the use of one section the pipe attached to the part A will be upon an angle of forty-five degrees with the pipe secured to B, thus enabling the pipe to be run upon an obtuse angle without having an elbow made for the special purpose; also, when a set-off is to be made one section of the elbow can, from its central joint, be turned partially around, as shown in Fig. 3, so that the smoke or other matter moving within the pipe will not meet with any abrupt turn in its deviation from a straight line.

If desired, one or more sections of pipe can be attached to the ends B, so as to make a greater run than would be done by the elbow alone.

It will be observed that the elbow can be used to advantage upon sheet-metal pipes for conducting water from the roof of buildings with a much less impediment to the flow of the fluid than is done in the ordinary right-angled elbow.

Having now described my invention, what I claim as new, and desire to secure by Letters Patent of the United States, is—

The elbow-pipe made in two sections, adapted to be telescoped together, and each section composed of two parts joined together at the angle, substantially as described, and for the purposes set forth.

JARED P. BARKER.

Witnesses:
 WM. S. COE,
 G. W. FORD.